(12) United States Patent
Brzezinski et al.

(10) Patent No.: US 11,420,254 B2
(45) Date of Patent: Aug. 23, 2022

(54) METHOD OF FORMING AN OBJECT USING 3D PRINTING

(71) Applicant: Desktop Metal, Inc., Burlington, MA (US)

(72) Inventors: Tomek Brzezinski, Lynnfield, MA (US); Michael A. Gibson, Boston, MA (US); Michael Kelly, Wilmington, MA (US)

(73) Assignee: Desktop Metal, Inc., Burlington, MA (US)

( * ) Notice: Subject to any disclaimer, the term of this patent is extended or adjusted under 35 U.S.C. 154(b) by 628 days.

(21) Appl. No.: 16/509,070

(22) Filed: Jul. 11, 2019

(65) Prior Publication Data
US 2020/0009654 A1 Jan. 9, 2020

Related U.S. Application Data

(63) Continuation of application No. 15/958,576, filed on Apr. 20, 2018, now Pat. No. 10,625,337.
(Continued)

(51) Int. Cl.
| | |
|---|---|
| *B22F 3/10* | (2006.01) |
| *B22F 3/24* | (2006.01) |
| *B29C 64/223* | (2017.01) |
| *B29C 64/40* | (2017.01) |
| *B22F 10/10* | (2021.01) |
(Continued)

(52) U.S. Cl.
CPC ............... *B22F 3/1025* (2013.01); *B22F 1/10* (2022.01); *B22F 3/24* (2013.01); *B22F 10/10* (2021.01); *B22F 10/12* (2021.01); *B29C 64/223* (2017.08); *B29C 64/40* (2017.08); *B22F 1/103* (2022.01); *B22F 2003/247* (2013.01);
(Continued)

(58) Field of Classification Search
CPC ............................... B22F 3/1025; B33Y 10/00
USPC ............................................................ 419/5
See application file for complete search history.

(56) References Cited

U.S. PATENT DOCUMENTS

| | | |
|---|---|---|
| 9,993,995 B2 | 6/2018 | Jacobs et al. |
| 2010/0096072 A1 | 4/2010 | Hopkins et al. |

(Continued)

FOREIGN PATENT DOCUMENTS

| | | |
|---|---|---|
| WO | WO 2010/049696 A2 | 5/2010 |
| WO | WO 2010/049696 A3 | 5/2010 |

(Continued)

OTHER PUBLICATIONS

International Search Report and Written Opinion dated Jul. 6, 2018 for International Application No. PCT/US2018/028624, entitled "Adhesion To Build Plate In 3D Printer", 96 pages.

*Primary Examiner* — Weiping Zhu
(74) *Attorney, Agent, or Firm* — Oak Law, PLLC; Jonathan D. Hall

(57) ABSTRACT

A 3D printer includes a build plate providing a surface on which an object is printed. Prior to printing, a sheet is fixed to the surface of the build plate. The sheet is composed of a material that adheres to a binder component of the feedstock used to print the object. During printing, the first layer of the printed object forms a bond with the sheet, which secures the location of the first layer and resists movement of the object during printing. Following printing and the object gaining sufficient rigidity, the object and sheet can be removed together from the printer. The sheet may then be peeled from
(Continued)

LATERAL VIEW the object, and the object can undergo debinding and/or sintering to create a finished object.

20 Claims, 7 Drawing Sheets

Related U.S. Application Data

(60) Provisional application No. 62/488,322, filed on Apr. 21, 2017.

(51) Int. Cl.
  *B22F 10/12* (2021.01)
  *B22F 1/10* (2022.01)
  *B33Y 40/00* (2020.01)
  *B33Y 10/00* (2015.01)
  *B33Y 30/00* (2015.01)
  *B22F 1/103* (2022.01)

(52) U.S. Cl.
  CPC ......... *B22F 2201/20* (2013.01); *B33Y 10/00* (2014.12); *B33Y 30/00* (2014.12); *B33Y 40/00* (2014.12)

(56) References Cited

U.S. PATENT DOCUMENTS

2015/0145174 A1 5/2015 Comb
2016/0031155 A1 2/2016 Tyler

FOREIGN PATENT DOCUMENTS

WO  WO 2015/116639 A1  8/2015
WO  WO 2017/048710 A1  3/2017

LATERAL VIEW

METHOD OF FORMING AN OBJECT USING 3D PRINTING

RELATED APPLICATIONS

This application is a continuation of U.S. patent application Ser. No. 15/958,576, filed Apr. 20, 2018, which claims the benefit of U.S. Provisional Application No. 62/488,322, filed on Apr. 21, 2017, the entire teachings of each of which are incorporated herein by reference in their entireties.

BACKGROUND

Metal injection molding (MIM) is a metalworking process useful in creating a variety of metal objects. A mixture of powdered metal and binder (e.g., a polymer such as polypropylene) forms a "feedstock" capable of being molded, at a high temperature, into the shape of a desired object. The initial molded part, also referred to as a "green part," then undergoes a debinding process to remove the binder, followed by a sintering process. During sintering, the part is brought to a temperature near the melting point of the powdered metal, which evaporates any remaining binder and forming the metal powder into a solid mass, thereby producing the desired object.

Additive manufacturing, also referred to as 3D printing, includes a variety of techniques for manufacturing a three-dimensional object via an automated process of forming successive layers of the object. 3D printers may utilize a feedstock comparable to that used in MIM, thereby creating a green part without the need for a mold. The green part may then undergo comparable debinding and sintering processes to produce the object.

SUMMARY

Example embodiments provide for fabricating objects through additive manufacturing. In an example embodiment, a method of printing an object via a 3D printer includes printing a first layer of an object onto a top surface of a base sheet secured to a top surface of a build plate, where the first layer adheres to the base sheet at at least one contact point, the first layer adhering to the base sheet via a bond between the base sheet and a binder component of the feedstock of the first layer. Subsequent layers of the object may then be printed above the first layer to complete the printed object. The bond may enable the base sheet to be peeled from the first layer while maintaining integrity of the first layer, thereby keeping all layers of the printed object together and intact following the print. The object may be separated from the object from the base sheet at the at least one contact point.

The base sheet may be composed of a material that forms a cross-linked bond with a binder material of the object at the at least one contact point during the printing. The object may be debinded via a chemical solvent. The base sheet may be composed of a material that dissolves in response to exposure to the chemical solvent.

The base sheet may be secured to a top surface of a build plate. Securing the base sheet may include printing the base sheet onto the tap surface of the build plate, applying an adhesive between the base sheet and the top surface of the build plate, applying a vacuum between the base sheet and the top surface of the build plate, or clamping the base sheet to the top surface of the build plate. The base sheet may be coupled to a magnet, and the magnet may be applied to the build plate to form a magnetic bond securing the base sheet to the build plate.

The base sheet may composed of at least one of polypropylene and polyethylene, and may have a thickness between 0.1 and 3 mm.

Further embodiments may include an assembly comprising a base sheet and an object printed via a 3D printer. The base sheet may be secured to a top surface of a build plate of the 3D printer, and the object may be printed via the 3D printer. The object may include a first layer adhering to a top surface of the base sheet at at least one contact point, the first layer adhering to the base sheet via a bond between the base sheet and a binder component of the feedstock of the first layer. The object may also include subsequent layers printed above the first layer.

In further embodiments, a base sheet may be secured to a top surface of a build plate. A first layer may then be printed onto a top surface of the base sheet, the first layer adhering to the base sheet at at least one contact point. The first layer may adhere to the base sheet via a bond between the base sheet and a binder component of the feedstock of the first layer. Subsequent layers of the object may then be printed above the first layer to complete the printed object. Following printing, the object and base sheet may be separated at the at least one contact point.

In still further embodiments, the base sheet may be composed of a material that forms a bond (e.g., a cross-linked bond) with a binder material of the object at the at least one contact point during the printing. The object may undergo a debinding process via a chemical solvent. The base sheet may be composed of a material that dissolves in response to exposure to the chemical solvent. The base sheet may be printed onto the top surface of the build plate.

In yet still farther embodiments, the base sheet may be secured to the build plate by applying an adhesive between the base sheet and the top surface of the build plate. Alternatively, the base sheet may be secured by applying a vacuum between the base sheet and the top surface of the build plate, or may be clamped to the build plate. As a further alternative, the base sheet may be coupled to a magnet, and the magnet may be applied to the build plate to form a magnetic bond securing the base sheet to the build plate. The base sheet may be composed of polypropylene or polyethylene.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
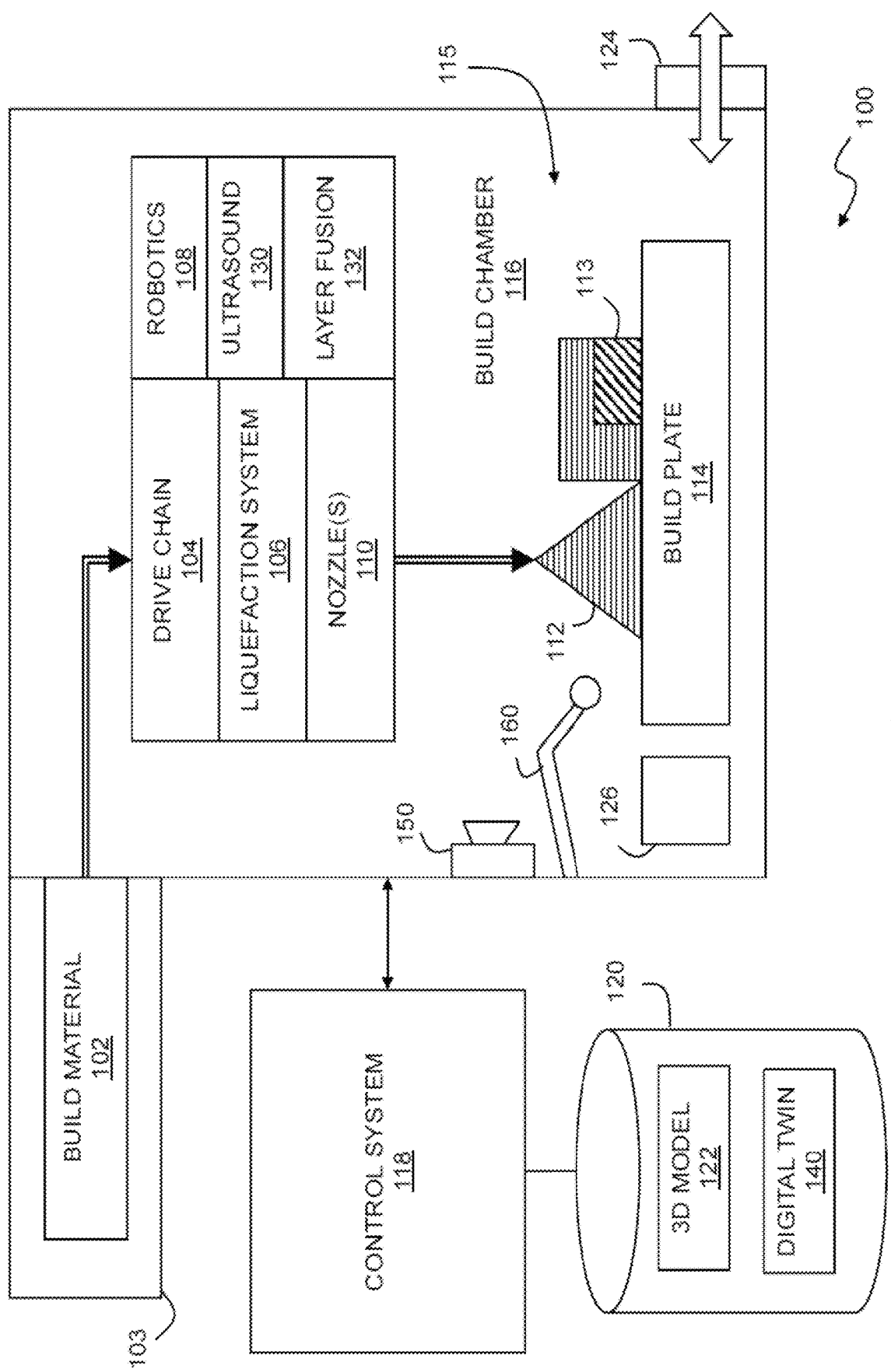
FIG. 1 is a block diagram of an additive manufacturing system for use with composites.

FIG. 1 is a block diagram of an additive manufacturing system for use with composites. The additive manufacturing system may include a three-dimensional printer 100 (or simply printer 100) that deposits metal using fused filament fabrication. Fused filament fabrication is well known in the art, and may be usefully employed for additive manufacturing with suitable adaptations to accommodate the forces, temperatures and other environmental requirements typical of the metallic injection molding materials described herein. In general, the printer 100 may include a build material 102 that is propelled by a drive train 104 and heated to a workable state by a liquefaction system 106, and then dispensed through one or more nozzles 110. By concurrently controlling robotic system 108 to position the nozzle(s) along an extrusion path, an object 112 may be fabricated on a build plate 114 within a build chamber 116. In general, a control system 118 manages operation of the printer 100 to fabricate the object 112 according to a three-dimensional model using a fused filament fabrication process or the like.

A variety of commercially available compositions have been engineered for metal injection molding ("MIM"). These highly engineered materials can also be adapted for use as a build material 102 in printing techniques such as fused filament fabrication. For example, MIM feedstock materials, when suitably shaped, may be usefully extruded through nozzles typical of commercially available FFF machines, and are generally flowable or extrudable within typical operating temperatures (e.g., 160-250 degrees Celsius) of such machines. This temperature range may depend on the binder—e.g., some binders achieve appropriate viscosities at about 205 degrees Celsius, while others achieve appropriate viscosities at lower temperatures such as about 160-180 C degrees Celsius. One of ordinary skill will recognize that these ranges (and all ranges listed herein) are provided by way of example and not of limitation. Further, while there are no formal limits on the dimensions for powder metallurgy materials, parts with dimensions of around 100 millimeters on each side have been demonstrated to perform well for FFF fabrication of net shape green bodies. Any smaller dimensions may be usefully employed, and larger dimensions may also be employed provided they are consistent with processing dimensions such as the print resolution and the extrusion orifice diameter. For example, implementations target about a 0.300 μm diameter extrusion, and the MIM metal powder may typically be about 1~22 μm diameter, although nano sized powders can be used. The term metal injection molding material, as used herein, may include any such engineered materials, as well as other fine powder bases such as ceramics in a similar binder suitable for injection molding. Thus, where the term metal injection molding or the commonly used abbreviation, MIM, is used, the term may include injection molding materials using powders other than, or in addition to, metals and, thus, may include ceramics. Also, any reference to "MIM materials," "powder metallurgy materials," "MIM feedstocks," or the like may generally refer to metal powder and/or ceramic powder mixed with one or more binding materials, e.g., a backbone binder that holds everything together and a bulk binder that carries the metal and backbone into position within a mold or print. Other material systems may be suitable for fabricating metal parts using fabrication techniques such as stereolithography or binder jetting, some of which are discussed in greater detail below. Such fabrication techniques may, in some applications, be identical to techniques for fabricating parts from ceramic material.

In general, fabrication of such materials may proceed as with a conventional FFF process, except that after the net shape is created, the green part may be optionally machined or finished while in a more easily workable state, and then debound and sintered into a final, dense object using any of the methods common in the art for MIM materials. The final object, as described above, may include a metal, a metal alloy, a ceramic, or another suitable combination of materials.

The build material 102 may be fed from a carrier 103 configured to dispense the build material to the three-dimensional printer either in a continuous (e.g., wire) or discrete (e.g., billet) form. The build material 102 may for example be supplied in discrete units one by one as billets or the like into an intermediate chamber for delivery into the build chamber 116 and subsequent melt and deposition. In another aspect, the carrier 103 may include a spool or cartridge containing the build material 102 in a wire form. Where a vacuum or other controlled environment is desired, the wire may be fed through a vacuum gasket into the build chamber 116 in a continuous fashion, however, typical MIM materials can be heated to a workable plastic state under normal atmospheric conditions, except perhaps for filtering or the like to remove particles from the build chamber 116. Thus in one aspect, there is described herein an apparatus including a MIM build material formed into a wire, the build material including an engineered composite of metal powder and a polymeric binder or the like, wherein the carrier 103 is configured to dispense the build material in a continuous feed to a three-dimensional printer. For environmentally sensitive materials, the carrier 103 may provide a vacuum environment for the build material 102 that can be directly or indirectly coupled to the vacuum environment of the build chamber 116. More generally, the build chamber 116 (and the carrier 103) may maintain any suitably inert environment for handling of the build material 102, such as a vacuum, and oxygen-depleted environment, an inert gas environment, or some gas or combination of gasses that are not reactive with the build material 102 where such conditions are necessary or beneficial during three-dimensional fabrication.

A drive train 104 may include any suitable gears, compression pistons, or the like for continuous or indexed feeding of the build material 116 into the liquefaction system 106. In one aspect, the drive train 104 may include gear shaped to mesh with corresponding features in the build material such as ridges, notches, or other positive or negative detents. In another aspect, the drive train 104 may use heated gears or screw mechanisms to deform and engage with the build material. Thus there is described in one aspect a printer for a fused filament fabrication process that heats a build material to a working temperature, and that heats a gear that engages with, deforms, and drives the composite in a feed path. A screw feed may also or instead be used.

For more brittle MIM materials, a fine-toothed drive gear of a material such as a hard resin or plastic may be used to grip the material without excessive cutting or stress concentrations that might otherwise crack, strip, or otherwise compromise the build material.

In another aspect, the drive train 104 may use bellows, or any other collapsible or telescoping press to drive rods, billets, or similar units of build material into the liquefaction system 106. Similarly, a piezoelectric or linear stepper drive may be used to advance a unit of build media in a non-continuous, stepped method with discrete, high-powered mechanical increments. In another aspect, the drive train 104 may include multiple stages. In a first stage, the drive train 104 may heat the composite material and form threads or other features that can supply positive gripping traction into the material. In the next stage, a gear or the like matching these features can be used to advance the build material along the feed path. A collet feed may be used (e.g., similar to those on a mechanical pencil). A soft wheel or belt drive may also or instead be used. In an aspect, a shape forming wheel drive may be used to ensure accuracy of size and thus the build. More generally, the drive train 104 may include any mechanism or combination of mechanisms used to advance build material 102 for deposition in a three-dimensional fabrication process.

The liquefaction system 106 may be any liquefaction system configured to heat the composite to a working temperature in a range suitable for extrusion in a fused filament fabrication process. Any number of heating techniques may be used. In one aspect, electrical techniques such as inductive or resistive heating may be usefully applied to liquefy the build material 102. This may, for example include inductively or resistively heating a chamber around the build material 102 to a temperature at or near the glass transition temperature of the build material 102, or some other temperature where the binder or other matrix becomes workable, extrudable, or flowable for deposition as described herein. Where the contemplated build materials are sufficiently conductive, they may be directly heated through contact methods (e.g., resistive heating with applied current) or non-contact methods (e.g., induction heating using an external electromagnet to drive eddy currents within the material). The choice of additives may further be advantageously selected to provide bulk electrical characteristics (e.g., conductance/resistivity) to improve heating. When directly heating the build material 102, it may be useful to model the shape and size of the build material 102 in order to better control electrically-induced heating. This may include estimates or actual measurements of shape, size, mass, etc.

In the above context, "liquefaction" does not require complete liquefaction. That is, the media to be used in printing may be in a multi-phase state, and/or form a paste or the like having highly viscous and/or non-Newtonian fluid properties. Thus the liquefaction system 106 described herein may include, more generally, any system that places a build material 102 in condition for use in fabrication as described herein.

In order to facilitate resistive heating of the build material 102, one or more contact pads, probes or the like may be positioned within the feed path for the material in order to provide locations for forming a circuit through the material at the appropriate location(s). In order to facilitate induction heating, one or more electromagnets may be positioned at suitable locations adjacent to the feed path and operated, e.g., by the control system 118, to heat the build material internally through the creation of eddy currents. In one aspect, both of these techniques may be used concurrently to achieve a more tightly controlled or more evenly distributed electrical heating within the build material. The printer 100 may also be instrumented to monitor the resulting heating in a variety of ways. For example, the printer 100 may monitor power delivered to the inductive or resistive circuits. The printer 100 may also or instead measure temperature of the build material 102 or surrounding environment at any number of locations. In another aspect, the temperature of the build material 102 may be inferred by measuring, e.g., the amount of force required to drive the build material 102 through a nozzle 110 or other portion of the feed path, which may be used as a proxy for the viscosity of the build material 102. More generally, any techniques suitable for measuring temperature or viscosity of the build material 102 and responsively controlling applied electrical energy may be used to control liquefaction for a fabrication process using composites as described herein.

The liquefaction system 106 may also or instead include any other heating systems suitable for applying heat to the build material 102 to a suitable temperature for extrusion. This may, for example include techniques for locally or globally augmenting heating using, e.g., chemical heating, combustion, ultrasound heating, laser heating, electron beam heating or other optical or mechanical heating techniques and so forth.

The liquefaction system 106 may include a shearing engine. The shearing engine may create shear within the composite as it is heated in order to maintain a mixture of the metallic base and a binder or other matrix, or to maintain a mixture of various materials in a paste or other build material. A variety of techniques may be employed by the shearing engine. In one aspect, the bulk media may be axially rotated as it is fed along the feed path into the liquefaction system 106. In another aspect, one or more ultrasonic transducers may be used to introduce shear within the heated material. Similarly, a screw, post, arm, or other physical element may be placed within the heated media and rotated or otherwise actuated to mix the heated material. In an aspect, bulk build material may include individual pellets, rods, or coils (e.g., of consistent size) and fed into a screw, a plunger, a rod extruder, or the like. For example, a coiled build material can be uncoiled with a heater system including a heated box, heated tube, or heater from the printer head. Also, a direct feed with no heat that feeds right into the print head is also possible.

The robotic system 108 may include a robotic system configured to three-dimensionally position the nozzle 110 within the working volume 115 of the build chamber 116. This may, for example, include any robotic components or systems suitable for positioning the nozzle 110 relative to the build plate 114 while depositing the composite in a pattern to fabricate the object 112. A variety of robotics systems are known in the art and suitable for use as the robotic system 108 described herein. For example, the robotics may include a Cartesian or xy-z robotics system employing a number of linear controls to move independently in the x-axis, the y-axis, and the z-axis within the build chamber 116. Delta robots may also or instead be usefully employed, which can, if properly configured, provide significant advantages in terms of speed and stiffness, as well as offering the design convenience of fixed motors or drive elements. Other configurations such as double or triple delta robots can increase range of motion using multiple linkages. More generally, any robotics suitable for controlled positioning of the nozzle 110 relative to the build plate 114, especially within a vacuum or similar environment, may be usefully employed including any mechanism or combination of mechanisms suitable for actuation, manipulation, locomotion and the like within the build chamber 116.

The nozzle(s) 110 may include one or more nozzles for dispensing the build material 102 that has been propelled with the drive train 104 and heated with the liquefaction system 106 to a suitable working temperature. In a multi-phase extrusion this may include a working temperature above the melting temperature of the metallic base of the composite, or more specifically between a first temperature at which the metallic base melts and the second temperature (above the first temperature) at which a second phase of the composite remains inert.

The nozzles 110 may, for example, be used to dispense different types of material so that, for example, one nozzle 110 dispenses a composite build material while another nozzle 110 dispenses a support material in order to support bridges, overhangs, and other structural features of the object 112 that would otherwise violate design rules for fabrication with the composite build material. In another aspect, one of the nozzles 110 may deposit a different type of material, such as a thermally compatible polymer or a metal or polymer loaded with fibers of one or more materials to increase tensile strength or otherwise improve mechanical properties of the resulting object 112. In an aspect, two types of supports may be used—(1) build supports and (2) sinter supports—e.g., using different materials printed into the same part to achieve these supports, or to create a distinguishing junction between these supports and the part.

The nozzle 110 may preferably be formed of a material or combination of materials with suitable mechanical and thermal properties. For example, the nozzle 110 will preferably not degrade at the temperatures wherein the composite material is to be dispensed, or due to the passage of metallic particles through a dispensing orifice therein. While nozzles for traditional polymer-based fused filament fabrication may be made from brass or aluminum alloys, a nozzle that dispenses metal particles may be formed of harder materials, or materials compatible with more elevated working temperatures such as a high carbon steel that is hardened and tempered. Other materials such as a refractory metal (e.g. molybdenum, tungsten) or refractory ceramic (e.g. mullite, corundum, magnesia) may also or instead be employed. In some instances, aluminum nozzles may instead be used for MIM extrusion of certain MIM materials. In another aspect, a softer thermally conductive material with a hard, wear-resistant coating may be used, such as copper with a hard nickel plating.

In one aspect, the nozzle 110 may include one or more ultrasound transducers 130 as described herein. Ultrasound may be usefully applied for a variety of purposes in this context. In one aspect, the ultrasound energy may facilitate extrusion by mitigating clogging by reducing adhesion of a build material to an interior surface of the nozzle 110. A variety of energy director techniques may be used to improve this general approach. For example, a deposited layer may include one or more ridges, which may be imposed by an exit shape of the nozzle 110, to present a focused area to receive ultrasound energy introduced into the interface between the deposited layer and an adjacent layer.

In another aspect, the nozzle 110 may include an induction heating element, resistive heating element, or similar components to directly control the temperature of the nozzle 110. This may be used to augment a more general liquefaction process along the feed path through the printer 100, e.g., to maintain a temperature of the build material 102 during fabrication, or this may be used for more specific functions, such as declogging a print head by heating the build material 102 substantially above the working range, e.g., to a temperature where the composite is liquid. While it may be difficult or impossible to control deposition in this liquid state, the heating can provide a convenient technique to reset the nozzle 110 without more severe physical intervention such as removing vacuum to disassemble, clean, and replace the affected components.

In another aspect, the nozzle 110 may include an inlet gas or fan, e.g., an inert gas, to cool media at the moment it exits the nozzle 110. The resulting gas jet may, for example, immediately stiffen the dispensed material to facilitate extended bridging, larger overhangs, or other structures that might otherwise require support structures underneath.

The object 112 may be any object suitable for fabrication using the techniques described herein. This may include functional objects such as machine parts, aesthetic objects such as sculptures, or any other type of objects, as well as combinations of objects that can be fit within the physical constraints of the build chamber 116 and build plate 114. Some structures such as large bridges and overhangs cannot be fabricated directly using fused filament fabrication or the like because there is no underlying physical surface onto which a material can be deposited. In these instances, a support structure 113 may be fabricated, preferably of a soluble or otherwise readily removable material, in order to support the corresponding feature.

Where multiple nozzles 110 are provided, a second nozzle may usefully provide any of a variety of additional build materials. This may, for example, include other composites, alloys, bulk metallic glass's, thermally matched polymers and so forth to support fabrication of suitable support structures. In one aspect, one of the nozzles 110 may dispense a bulk metallic glass that is deposited at one temperature to fabricate a support structure 113, and a second, higher temperature at an interface to a printed object 112 where the bulk metallic glass can be crystallized at the interface to become more brittle and facilitate mechanical removal of the support structure 113 from the object 112. Conveniently, the bulk form of the support structure 113 can be left in the super-cooled state so that it can retain its bulk structure and be removed in a single piece. Thus in one aspect there is described herein a printer that fabricates a portion of a support structure 113 with a bulk metallic glass in a super-cooled liquid region, and fabricates a layer of the support structure adjacent to a printed object at a greater temperature in order to crystalize the build material 102 into a non-amorphous alloy. The bulk metallic glass particles may thus be loaded into a MIM feedstock binder system and may provide a support. Pure binding or polymer materials (e.g., without any loading) may also or instead provide a support. A similar metal MIM feedstock may be used for multi-material part creation. Ceramic or dissimilar metal MIM feedstock may be used for a support interface material.

Support Materials

In general, the MIM media includes a binder and a metal powder (or other material as described herein, such as ceramic powder). A support material may also be provided from a second nozzle consisting of, e.g., the binder used for the injection molding material, without the structural material that sinters into the final object. In another aspect, the support material may be formed of a wax, or some other thermoplastic or other polymer that can be removed during processing of a printed green body. This support material may, for example, be used for vertical supports, as well as for top or side supports, or any other suitable support structures to provide a physical support during printing and subsequent sintering. Printing and sintering may impose different support requirements. As such, different support materials and or different support rules may be employed for each type of required support. Additionally, the print supports may be removed after a print and before sintering, while sintering supports would be left attached to the green object until sintering is completed (or sufficiently completed to eliminate the need for the sintering support structures).

In another aspect, the second nozzle (or a third nozzle) may be used to provide an interface material that is different from the support material, such as the corresponding binder, along with a ceramic or some other material that will not sinter under the time and temperature conditions used to sinter the injection molding material. This may also or instead include a metal or the like that forms a brittle interface with the sintered part so that it can break away from the final object easily after sintering. Where this interface material does not sinter, it may be used in combination with a sinterable support structure that can continue to provide structural support during a sintering process.

The support material(s) may usefully integrate other functional substances. For example, titanium may be added to the support material as an oxygen getter to improve the build environment without introducing any titanium into the fabricated object. Other types of additives may also or instead be used to remove contaminants. For example, a zirconium powder (or other strong carbide former) may be added to the support material in order to extract carbon contamination during sintering.

Nested Parts

In one aspect, the use of non-structural support at the interface, e.g. a pure binder that does not sinter into a structural object, may be used to facilitate the additive manufacture of nested parts. For example, a complete gear box or the like may be fabricated within an enclosure, with the surfaces between gear teeth fabricated with a non-sintering binder or other material. In one aspect, critical mechanical interfaces for such mechanical parts may be oriented to the fabrication process, e.g., by orienting mating surfaces vertically so that smaller resolutions can be used. More generally, the capability to print adjacent, non-coupled parts may be used to fabricate multiple physically related parts in a single print job. This may, for example, include hinges, gears, captive bearings or other nested or interrelated parts. Non-sintering support material may be extracted, e.g., using an ultrasonicator, fluid cleaning, or other techniques after the object is sintered to a final form. In an aspect, the binder is loaded with a non-sintering additive such as ceramic or dissimilar, higher sintering temp metal.

This general approach may also affect the design of the part. For example, axles may employ various anti-backlash techniques so that the sintered part is more securely retained during movement and use. Similarly, fluid paths may be provided for fluid cleaning, and removal paths may be created for interior support structures. This technique may also be used to address other printing challenges. For example, support structures within partially enclosed spaces may be fabricated for removal through some removal path after the object is completed. If the support structures are weakly connected, or unconnected, to the fabricated object, they can be physically manipulated for extraction through the removal path. In an aspect, parts may be "glued" together with an appropriate (e.g., the same) MIM material to make larger parts that essentially have no joints once sintered.

The build plate 114 within the working volume 115 of the build chamber 116 may include a rigid and substantially planar surface formed of any substance suitable for receiving deposited composite or other material(s)s from the nozzles 110. In one aspect, the build plate 114 may be heated, e.g., resistively or inductively, to control a temperature of the build chamber 116 or the surface upon which the object 112 is being fabricated. This may, for example, improve adhesion, prevent thermally induced deformation or failure, and facilitate relaxation of stresses within the fabricated object. In another aspect, the build plate 114 may be a deformable build plate that can bend or otherwise physical deform in order to detach from the rigid object 112 formed thereon.

The build chamber 116 may be any chamber suitable for containing the build plate 114, an object 112, and any other components of the printer 100 used within the build chamber 116 to fabricate the object 112. In one aspect, the build chamber 116 may be an environmentally sealed chamber that can be evacuated with a vacuum pump 124 or similar device in order to provide a vacuum environment for fabrication. This may be particularly useful where oxygen causes a passivation layer that might weaken layer-to-layer bonds in a fused filament fabrication process as described herein, or where particles in the atmosphere might otherwise interfere with the integrity of a fabricated object, or where the build chamber 116 is the same as the sintering chamber. In another aspect, only oxygen is removed from the build chamber 116.

Similarly, one or more passive or active oxygen getters 126 or other similar oxygen absorbing material or system may usefully be employed within the build chamber 116 to take up free oxygen within the build chamber 116. The oxygen getter 126 may, for example, include a deposit of a reactive material coating an inside surface of the build chamber 116 or a separate object placed therein that completes and maintains the vacuum by combining with or adsorbing residual gas molecules. The oxygen getters 126, or more generally, gas getters, may be deposited as a support material using one of the nozzles 110, which facilitates replacement of the gas getter with each new fabrication run and can advantageously position the gas getter(s) near printed media in order to more locally remove passivating gasses where new material is being deposited onto the fabricated object. In one aspect, the oxygen getters 126 may include any of a variety of materials that preferentially react with oxygen including, e.g., materials based on titanium, aluminum, and so forth. In another aspect, the oxygen getters 126 may include a chemical energy source such as a combustible gas, gas torch, catalytic heater, Bunsen burner, or other chemical and/or combustion source that reacts to extract oxygen from the environment. There are a variety of low-CO and NOx catalytic burners that may be suitably employed for this purpose without CO.

In one aspect, the oxygen getter 126 may be deposited as a separate material during a build process. Thus in one aspect there is described herein a process for fabricating a three-dimensional object from a metallic composite including co-fabricating a physically adjacent structure (which may or may not directly contact the three-dimensional object) containing an agent to remove passivating gasses around the three-dimensional object. Other techniques may be similarly employed to control reactivity of the environment within the build chamber 116, or within post-processing chambers or the like as described below. For example, the build chamber 116 may be filled with an inert gas or the like to prevent oxidation.

The control system 118 may include a processor and memory, as well as any other co-processors, signal processors, inputs and outputs, digital-to-analog or analog-to-digital converters and other processing circuitry useful for monitoring and controlling a fabrication process executing on the printer 100. The control system 118 may be coupled in a communicating relationship with a supply of the build material 102, the drive train 104, the liquefaction system 106, the nozzles 110, the build plate 114, the robotic system 108, and any other instrumentation or control components associated with the build process such as temperature sensors, pressure sensors, oxygen sensors, vacuum pumps, and so forth. The control system 118 may be operable to control the robotic system 108, the liquefaction system 106 and other components to fabricate an object 112 from the build material 102 in three dimensions within the working volume 115 of the build chamber 116.

The control system 118 may generate machine ready code for execution by the printer 100 to fabricate the object 112 from the three-dimensional model 122. The control system 118 may deploy a number of strategies to improve the resulting physical object structurally or aesthetically. For example, the control system 118 may use plowing, ironing, planing, or similar techniques where the nozzle 110 runs over existing layers of deposited material, e.g., to level the material, remove passivation layers, apply an energy director topography of peaks or ridges to improve layer-to-layer bonding, or otherwise prepare the current layer for a next layer of material. The nozzle 110 may include a low-friction or non-stick surface such as Teflon, TiN or the like to facilitate this plowing process, and the nozzle 110 may be heated and/or vibrated (e.g., using an ultrasound transducer) to improve the smoothing effect. In one aspect, this surface preparation may be incorporated into the initially-generated machine ready code. In another aspect, the printer 100 may dynamically monitor deposited layers and determine, on a layer-bylayer basis, whether additional surface preparation is necessary, or helpful for successful completion of the object.

In one aspect, the control system 118 may employ pressure or flow rate as a process feedback signal. While temperature is frequently the critical physical quantity for fabrication with thermoplastic binders, it may be difficult to accurately measure the temperature of a composite build material throughout the feed path. However, the temperature can be inferred by the viscosity of the build material, which can be estimated for the bulk material based on how much force is being applied to drive the material through a feed path. Thus in one aspect, there is described herein a printer that measures the force applied by a drive train to a composite such as any of the composites described above, infers a temperature of the build material based on the instantaneous force, and controls a liquefaction system to adjust the temperature accordingly.

In general, a three-dimensional model 122 of the object may be stored in a database 120 such as a local memory of a computer used as the control system 118, or a remote database accessible through a server or other remote resource, or in any other computer-readable medium accessible to the control system 118. The control system 118 may retrieve a particular three-dimensional model 122 in response to user input, and generate machine-ready instructions for execution by the printer 100 to fabricate the corresponding object 112. This may include the creation of intermediate models, such as where a CAD model is converted into an STL model or other polygonal mesh or other intermediate representation, which can in turn be processed to generate machine instructions for fabrication of the object 112 by the printer 100.

In another aspect, the nozzle 110 may include one or more mechanisms to flatten a layer of deposited material and apply pressure to bond the layer to an underlying layer. For example, a heated nip roller, caster, or the like may follow the nozzle 110 in its path through an x-y plane of the build chamber to flatten the deposited (and still pliable) layer. The nozzle 110 may also or instead integrate a forming wall, planar surface or the like to additionally shape or constrain a build material 102 as it is deposited by the nozzle 110. The nozzle 110 may usefully be coated with a non-stick material (which may vary according to the build material being used) in order to facilitate more consistent shaping and smoothing by this tool.

In another aspect, a layer fusion system 132 may be used to encourage good mechanical bonding between adjacent layers of deposited build material within the object 112. This may include the ultrasound transducers described above, which may be used to facilitate bonding between layers by applying ultrasound energy to an interface between layers during deposition. In another aspect, current may be passed through an interface between adjacent layers in order to Joule heat the interface and liquefy or soften the materials for improved bonding. Thus in one aspect, the layer fusion system 132 may include a joule heating system configured to apply a current between a first layer of the build material and a second layer of the build material in the working volume 115 while the first layer is being deposited on the second layer. In another aspect, the layer fusion system 132 may include an ultrasound system for applying ultrasound energy to a first layer of the build material while the first layer is being deposited onto a second layer of the build material in the working volume 115. In another aspect, the layer fusion system 132 may include a rake, ridge(s), notch(es) or the like formed into the end of the nozzle 110, or a fixture or the like adjacent to the nozzle, in order to form energy directors on a top surface of a deposited material. Other techniques may also or instead be used to improve layer-to-layer bonding, such as plasma cleaning or other depassivation before or during formation of the interlayer bond. The use of injection molding materials can alleviate many of the difficulties of forming layer-to-layer bonds with deposited metals, but these and other techniques may nonetheless be useful in improving interlayer bonds and/or shaping a fabricated object as described herein.

During fabrication, detailed data may be gathered for subsequent use and analysis. This may, for example, include a camera and computer vision system that identifies errors, variations, or the like that occur in each layer of an object. Similarly, tomography or other imaging techniques may be used to detect and measure layer-to-layer interfaces, aggregate part dimensions, diagnostic information (e.g., defects, voids) and so forth. This data may be gathered and delivered with the object to an end user as a digital twin 140 of the object 112 so that the end user can evaluate whether and how variations and defects might affect use of the object 112. In addition to spatial/geometric analysis, the digital twin 140 may log process parameters including, for example, aggregate statistics such as weight of material used, time of print, variance of build chamber temperature, and so forth, as well as chronological logs of any process parameters of interest such as volumetric deposition rate, material temperature, environment temperature, and so forth.

The printer 100 may include a camera 150 or other optical device. In one aspect, the camera 150 may be used to create the digital twin 140 described above, or to more generally facilitate machine vision functions or facilitate remote monitoring of a fabrication process. Video or still images from the camera 150 may also or instead be used to dynamically correct a print process, or to visualize where and how automated or manual adjustments should be made, e.g., where an actual printer output is deviating from an expected output.

The printer 100 may also usefully integrate a subtractive fabrication tool 160 such as a drill, milling bit, or other multi-axis controllable tool for removing material from the object 112 that deviates from an expected physical output based on the 3D model 122 used to fabricate the object 112. While combinations of additive and subtractive technologies have been described, the use of MIM materials provides a unique advantage when subtractive shaping is performed on a green object after net shape forming but before sintering (or debinding), when the object 112 is relatively soft and workable. This permits quick and easy removal of physically observable defects and printing artifacts before the object 112 is sintered into a metal object. An aspect may instead include tapping threads or otherwise adding features as opposed to subtracting parts. Similarly, an aspect may include combining multiple single green parts into one larger fully solid sintered part.

Other useful features may be integrated into the printer 100 described above. For example, a solvent or other material may be usefully applied a surface of the object 112 during fabrication to modify its properties. This may, for example intentionally oxidize or otherwise modify the surface at a particular location or over a particular area in order to provide a desired electrical, thermal optical, or mechanical property. This capability may be used to provide aesthetic features such as text or graphics, or to provide functional features such as a window for admitting RF signals.

Design Rules

In general, a fabrication process such as fused filament fabrication implies, or expressly includes, a set of design rules to accommodate physical limitations of a fabrication device and a build material. For example, a horizontal shelf cannot be fabricated without positioning a support structure underneath. While the design rules for FFF may apply to fabrication of a green body using FFF techniques as described herein, the green body may also be subject to various MIM design rules. This may, for example, include a structure to prevent or minimize drag on a floor while a part shrinks during sintering which may be 20% or more depending on the composition of the green body. Similarly, certain supports are required during sintering that are different than the supports required during fused filament fabrication. As another example, injection molding typically aims for uniform wall thickness to reduce variability in debinding and/or sintering behaviors, with thinner walls being preferred. The system described herein may apply to disparate sets of design rules—those for the rapid prototyping system (e.g., fused filament fabrication) and those for the sintering process (e.g., MIM design rules)—to a CAD model that is being prepared for fabrication.

These rules may also be combined under certain conditions. For example, the support structures for a horizontal shelf during fabrication must resist the force of an extrusion/deposition process used to fabricate the horizontal shelf, whereas the support structure during sintering only needs to resist the forces of gravity during the baking process. Thus there may be two separate supports that are removed at different times during a fabrication process: the fabrication supports that are configured to resist the force of a fabrication process and may be breakaway supports that are loosely mechanically coupled to a green body, along with sintering supports that may be less extensive, and only need to resist the gravitation forces on a body during sintering. These latter supports are preferably coupled to the object through a nonsinterable layer to permit easy removal from the densified final object. In another aspect, the fabrication supports may be fabricated from binder without a powder or other fill so that they completely disappear during a sintering process.

Figure 2:
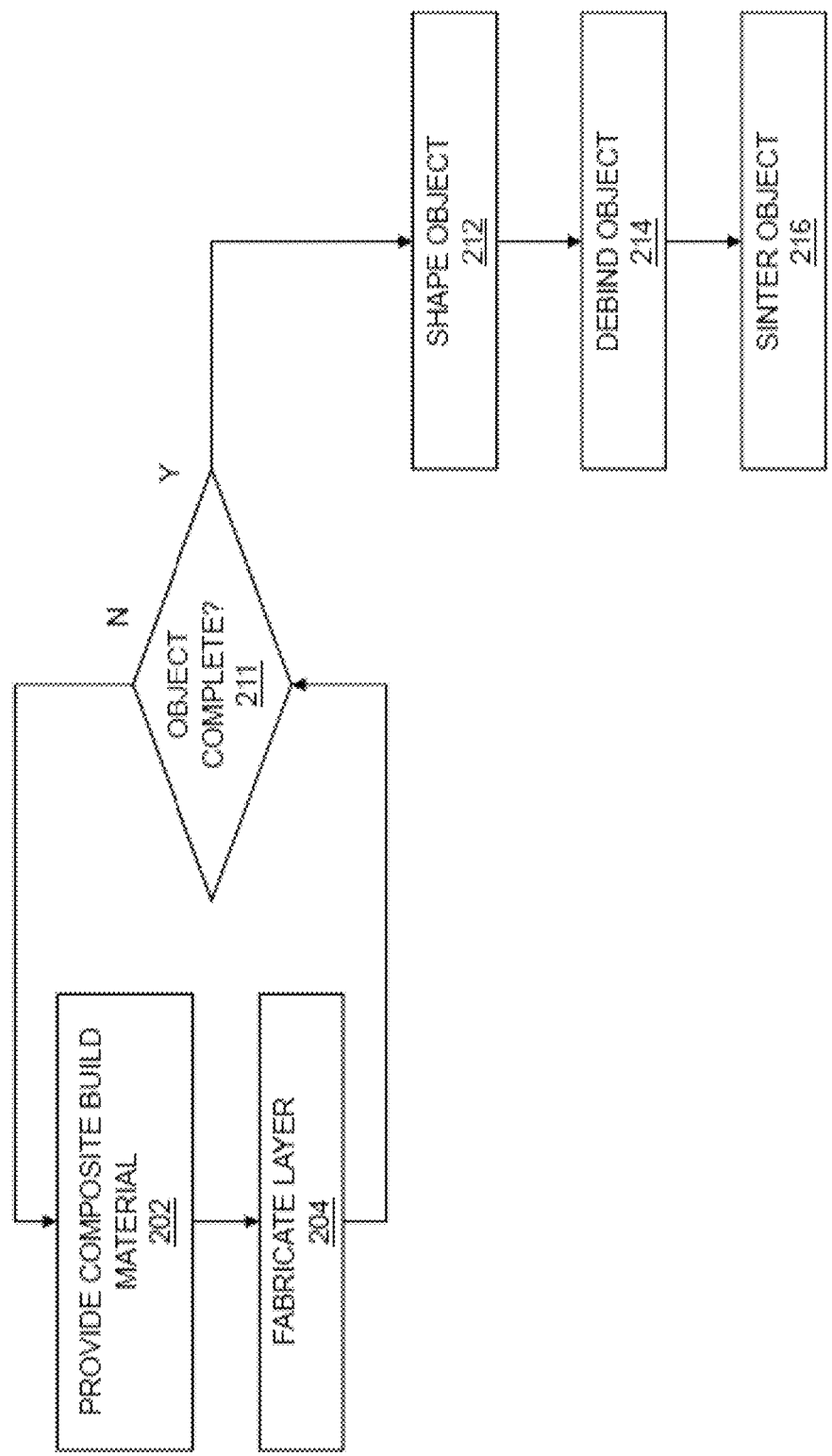
FIG. 2 is a flow chart of a method for printing with composites.

FIG. 2 shows a flow chart of a method for printing with composites, e.g., metal injection molding materials. As shown in step 202, the process 200 may include providing a build material including an injection molding material, or where a support interface is being fabricated, a MIM binder (e.g., a MIM binder with similar thermal characteristics). The material may include, for example, any of the MIM materials described herein. The material may be provided as a build material in a billet, a wire, or any other cast, drawn, extruded or otherwise shaped bulk form. As described above, the build material may be further packaged in a cartridge, spool, or other suitable carrier that can be attached to an additive manufacturing system for use.

As shown in step 204, the process may include fabricating a layer of an object. This may include any techniques that can be adapted for use with MIM materials. For example, this may include fused filament fabrication, jet printing, selective laser sintering, or any other techniques for forming a net shape from a MIM material (and more specifically for techniques used for forming a net shape from a polymeric material loaded with a second phase powder).

As shown in step 211, this process may be continued and repeated as necessary to fabricate an object within the working volume. While the process may vary according to the underlying fabrication technology, an object can generally be fabricated layer by layer based on a three-dimensional model of the desired object. As shown in step 212, the process 200 may include shaping the net shape object after the additive process is complete. Before debinding or sintering, the green body form of the object is usefully in a soft, workable state where defects and printing artifacts can be easily removed, either manually or automatically. Thus the process 200 may take advantage of this workable, intermediate state to facilitate quality control or other process-related steps, such as removal of supports that are required for previous printing steps, but not for debinding or sintering.

As shown in step 214, the process 200 may include debinding the printed object. In general debinding may be performed chemically or thermally to remove a binder that retains a metal (or ceramic or other) powder in a net shape. Contemporary injection molding materials are often engineered for thermal debinding, which advantageously permits debinding and sintering to be performed in a single baking operation, or in two similar baking operations. In general, the debinding process functions to remove binder from the net shape green object, thus leaving a very dense structure of metal (or ceramic or other) particles that can be sintered into the final form.

As shown in step 216, the process 200 may include sintering the printed and debound object into a final form. In general, sintering may be any process of compacting and forming a solid mass of material by heating without liquefaction. During a sintering process, atoms can diffuse across particle boundaries to fuse into a solid piece. Because sintering can be performed at temperatures below the melting temperature, this advantageously permits fabrication with very high melting point materials such as tungsten and molybdenum.

Numerous sintering techniques are known in the art, and the selection of a particular technique may depend upon the build material used, and the desired structural, functional or aesthetic result for the fabricated object. For example, in solid-state (non-activated) sintering, metal powder particles are heated to form connections (or "necks") where they are in contact. Over time, these necks thicken and create a dense part, leaving small, interstitial voids that can be closed, e.g., by hot isostatic pressing (HIP) or similar processes. Other techniques may also or instead be employed. For example, solid state activated sintering uses a film between powder particles to improve mobility of atoms between particles and accelerate the formation and thickening of necks. As another example, liquid phase sintering may be used, in which a liquid forms around metal particles. This can improve diffusion and joining between particles, but also may leave lower-melting phase within the sintered object that impairs structural integrity. Other advanced techniques such as nano-phase separation sintering may be used, for example to form a high-diffusivity solid at the necks to improve the transport of metal atoms at the contact point Debinding and sintering may result in material loss and compaction, and the resulting object may be significantly smaller than the printed object. However, these effects are generally linear in the aggregate, and net shape objects can be usefully scaled up when printing to create a corresponding shape after debinding and sintering.

Figure 3:
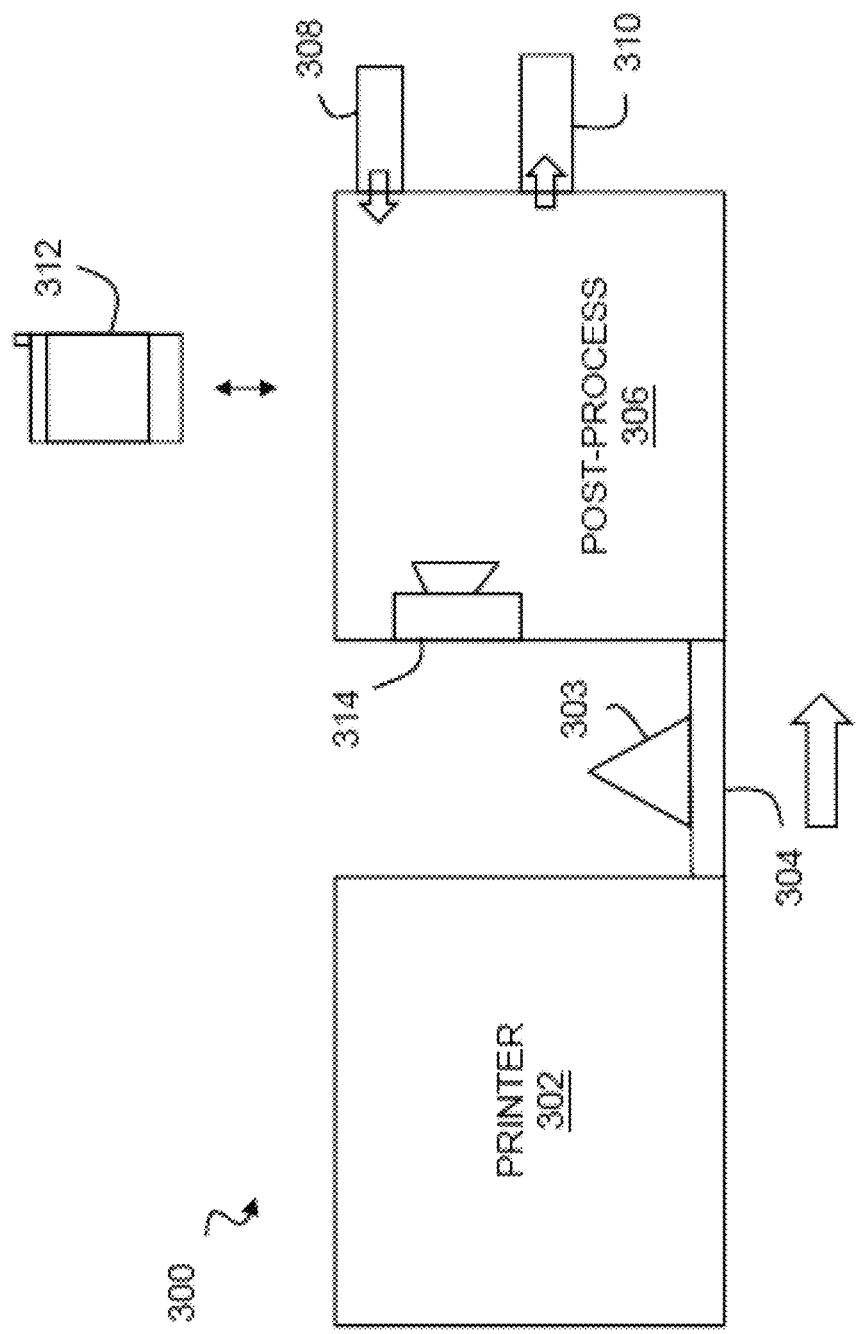
FIG. 3 illustrates an additive manufacturing system for use with metal injection molding materials.

FIG. 3 shows an additive manufacturing system for use with metal injection molding materials. The system 300 may include a printer 302, a conveyor 304, and a postprocessing station 306. In general, the printer 302 may be any of the printers described above including, for example a fused filament fabrication system, a stereolithography system, a selective laser sintering system, or any other system that can be usefully adapted to form a net shape object under computer control using injection molding build materials. The output of the printer 302 may be an object 303 that is a green body including any suitable powder (e.g., metal, metal alloy, ceramic, and so forth, as well as combinations of the foregoing), along with a binder that retains the powder in a net shape produced by the printer 302.

The conveyor 304 may be used to transport the object 303 from the printer 302 to a post-processing station 306 where debinding and sintering can be performed. The conveyor 304 may be any suitable device or combination of devices suitable for physically transporting the object 303. This may, for example, include robotics and a machine vision system or the like on the printer side for detaching the object 303 from a build platform or the like, as well as robotics and a machine vision system or the like on the post-processing side to accurately place the object 303 within the post-processing station 306. In another aspect, the post-processing station 306 may serve multiple printers so that a number of objects can be debound and sintered concurrently, and the conveyor 304 may interconnect the printers and post-processing station so that multiple print jobs can be coordinated and automatically completed in parallel. In another aspect, the object 303 may be manually transported between the two corresponding stations.

The post-processing station 306 may be any system or combination of systems useful for converting a green part formed into a desired net shape from a metal injection molding build material by the printer 302 into a final object. The post-processing station 306 may, for example, include a chemical debinding station and a thermal sintering station that can be used in sequence to produce a final object. Some contemporary injection molding materials are engineered for thermal debinding, which makes it possible to perform a combination of debinding and sintering steps with a single oven or similar device. While the thermal specifications of a sintering furnace may depend upon the powder to be sintered, the binder system, the loading, and other aspects of the green object and the materials used to manufacture same, commercial sintering furnaces for thermally debound and sintered MIM parts may typically operate with an accuracy of +/−5 degrees Celsius or better, and temperatures of at least 600 degrees C., or from about 200 degrees C. to about 1900 degrees C. for extended times. Any such furnace or similar heating device may be usefully employed as the post-processing station 306 as described herein. Vacuum or pressure treatment may also or instead be used. In an aspect, identical or similar material beads with a non-binding coating may be used for a furnace support—e.g., packing in a bed of this material that shrinks similar to the part, except that it will not bond to the part.

Embodiments may be implemented with a wide range of other debinding and sintering processes. For example, the binder may be removed in a chemical debind, thermal debind, or some combination of these. Other debinding processes are also known in the art (such as supercritical or catalytic debinding), any of which may also or instead be employed by the post-processing station 306 as described herein. For example, in a common process, a green part is first debound using a chemical debind, which is following by a thermal debind at a moderately high temperature (in this context, around 700-800 C) to remove organic binder and create enough necks among a powdered material to permit handling. From this stage, the object may be moved to a sintering furnace to remove any remaining components of a binder system densify the object. In another aspect, a pure thermal debind may be used to remove the organic binder. More general, any technique or combination of techniques may be usefully employed to debind an object as described herein.

Similarly, a wide range of sintering techniques may be usefully employed by the post-processing station. In one aspect, an object may be consolidated in a furnace to a high theoretical density using vacuum sintering. In another aspect, the furnace may use a combination of flowing gas (e.g., at below atmosphere, slightly above atmosphere, or some other suitable pressure) and vacuum sintering. More generally, any sintering or other process suitable for improving object density may be used, preferably where the process yields a near-theoretical density part with little or no porosity. Hot-isostatic pressing ("HIP") may also (e.g., as a postsinter finishing step) or instead be employed, e.g., by applying elevated temperatures and pressures of 10-50 ksi, or between about 15 and 30 ksi. In another aspect, the object may be processed using any of the foregoing, followed by a moderate overpressure (greater than the sintering pressure, but lower than HIP pressures). In this latter process, gas may be pressurized at 100-1500 psi and maintained at elevated temperatures within the furnace or some other supplemental chamber. In another aspect, the object may be separately heated in one furnace, and then immersed in a hot granular media inside a die, with pressure applied to the media so that it can be transmitted to the object to drive more rapid consolidation to near full density. More generally, any technique or combination of techniques suitable for removing binder systems and driving a powdered material toward consolidation and densification may be used by the post-processing station 306 to process a fabricated green part as described herein.

In one aspect, the post-processing station 306 may be incorporated into the printer 302, thus removing a need for a conveyor 304 to physically transport the object 303. The build volume of the printer 302 and components therein may be fabricated to withstand the elevated debinding/sintering temperatures. In another aspect, the printer 302 may provide movable walls, barriers, or other enclosure(s) within the build volume so that the debind/sinter can be performed while the object 303 is on a build platform within the printer 302, but thermally isolated from any thermally sensitive components or materials.

The post-processing station 306 may be optimized in a variety of ways for use in an office environment. In one aspect, the post-processing station 306 may include an inert gas source 308. The inert gas source 308 may, for example, include argon or other inert gas (or other gas that is inert to the sintered material), and may be housed in a removable and replaceable cartridge that can be coupled to the post-processing station 306 for discharge into the interior of the post-processing station 306, and then removed and replaced when the contents are exhausted. The post-processing station 306 may also or instead include a filter 310 such as a charcoal filter or the like for exhausting gasses that can be outgassed into an office environment in an unfiltered form. For other gasses, an exterior exhaust, or a gas container or the like may be provided to permit use in unventilated areas. For reclaimable materials, a closed system may also or instead be used, particularly where the environmental materials are expensive or dangerous.

In one aspect, the post-processing station 306 may be coupled to other system components. For example, the post-processing station 306 may include information from the printer 302, or from a controller for the printer, about the geometry, size, mass and other physical characteristics of the object 303 in order to generate a suitable debinding and sintering profile. In another aspect, the profile may be independently created by the controller or other resource and transmitted to the post-processing station 306 when the object 303 is conveyed. In another aspect, the post-processing station 306 may monitor the debinding and sintering process and provide feedback, e.g., to a smart phone or other remote device 312, about a status of the object, a time to completion, and other processing metrics and information. The post-processing station 306 may include a camera 314 or other monitoring device to provide feedback to the remote device 312, and may provide time lapse animation or the like to graphically show sintering on a compressed time scale. Post-processing may also or instead include finishing with heat, a hot knife, tools, or similar, and may include applying a finish coat.

Microwave Sintering

In one aspect, the post-processing station 306 may employ microwave sintering to accelerate post processing. Powdered metals in particular are very good absorbers of microwave energy and can be efficiently heated using microwave techniques. Ceramics can also be sintered in this manner, where microwave heating is linked to the dielectric loss of the material and other factors. Any other configuration suitable for microwave heating in an amount and for a duration suitable for sintering of MIM materials may also or instead be employed. Where the binder system of the build material is also engineered for thermal debinding, the method may include debinding the green object by applying microwave energy, e.g., using the post-processing station 306 described above.

Stereolithography With MIM Materials

Figure 4:
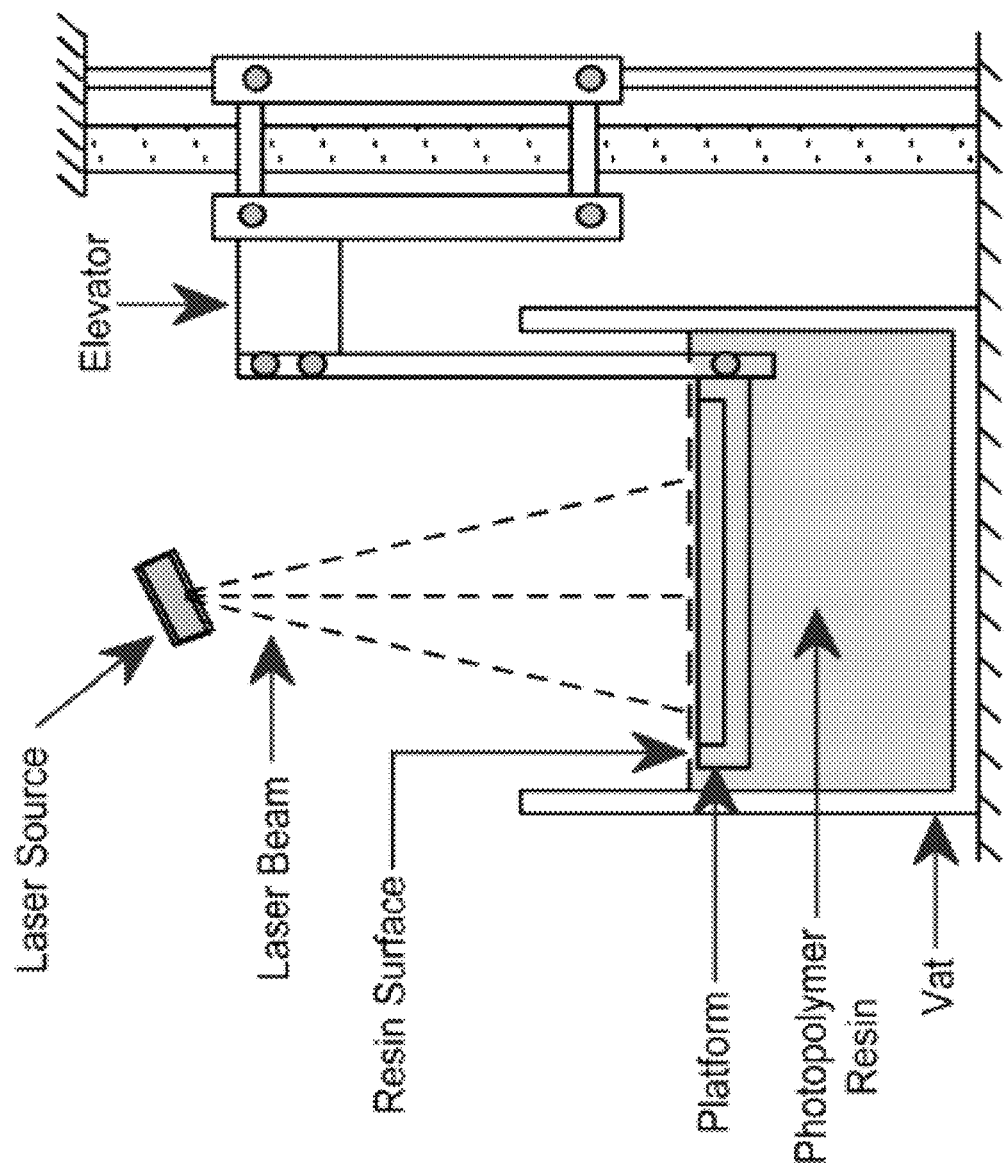
FIG. 4 illustrates a stereolithography process using a metallic powder and an ultraviolet-curable binder.

FIG. 4 illustrates a stereolithography process using a metallic powder and an ultraviolet-curable binder. In general, a build material may be formed using an injection molding powder, such as any of those described herein, along with an ultraviolet-curable binder such as any suitable photopolymer resin that can be cured using stereolithography. This build material may be cured on a layer-by-layer basis with an ultraviolet laser using known stereolithography techniques to form a UV-cured green body having a shape of the desired object. MIM powders may generally be opaque, and adaptations to the laser light source may be used to improve the structural integrity of the fabricated green object, such as using a layer size equal to or less than an average powder diameter, or providing laser light from multiple sources/directions in order to reduce or minimize occlusion of the UV resin at each layer. In another aspect, there is described herein a sinterable, net shape green body object based formed according to a computer model and including a base material in powder form and an ultraviolet curable (or ultraviolet-cured) resin that can be debound and/or sintered into a final object, as well as a process for sintering an object comprising a base material in powder form and an ultraviolet-cured resin. The metallic powder may be suspended within an ultraviolet-curable binder, creating a slurry or suspension. The mass and surface area of the particles versus the specific rheology of the binder may dictate whether or not the powder will float indefinitely or settle due to gravity. Using nano sized particles may optimize the powders ability to form a stable suspension that does not settle (over reasonable timescales).

In order to reduce binder char and subsequent carbon contamination and increase shape retention, the binder may usefully be composed of two parts—a UV curable resin and a second component that may be removed (e.g. debound) prior to insertion into the furnace. Similar multicomponent binder formulations have been shown to reduce carbon pickup from the burnout process and reduce part failures by buildup of gases inside the part. Many possible binder combinations exist, including poly(ethylene glycol) (PEG) as a solvent-soluble component that may be removed prior to insertion into the furnace, along with a backbone based on poly(ethylene glycol) diacrylate (PEG-DA), or any number of other UV curable resins.

The ultraviolet-curable resin may, for example include a commercially available investment casting resin engineered for stereolithography fabrication, or any other suitable UV curable resin or the like. The UV curable resin may usefully incorporate an increased concentration of an activating die (at least 50% greater than typical commercially available UV curable resins) to compensate for optical interference of opaque particles.

In another aspect, the process may be modified to address particle opacity in other ways. For example, the current layer may be coated with polymer (e.g., by moving the object along the z-axis within a bath, either up or down according to the species of stereolithography being employed), and then a powder may be introduced, after which the layer may be cured in a desired cross section using UV exposure. In another aspect, the layer may be cured, powdered, and then coated with another layer of powder, so that the resin is fully exposed to the UV stimulus before coating with an additional powder layer.

In another aspect, the mixture of a MIM powder and a UV-curable resin may be dispensed and cured on the fly in order to remove or reduce the need for a resin holding tank. More generally, any technique for local thermal activation of a binder may be used in combination with a powder bed of MIM material (and binder) as described herein to form a green body. For example, targeted thermal activation may be achieved with a thermal print head, an IR heating mask and/or lamp, focused microwave energy, selective thermal sintering, steering of an activation beam with a digital light processing chip, a heated roller, or any other technique or combination of techniques. For example, a variety of thermal print heads are commercially available, e.g., from Kyocera and other manufacturers that may be suitably adapted to applying targeted thermal energy to a layer of binder and MIM powder.

SLS with MIM Materials

Figure 5:
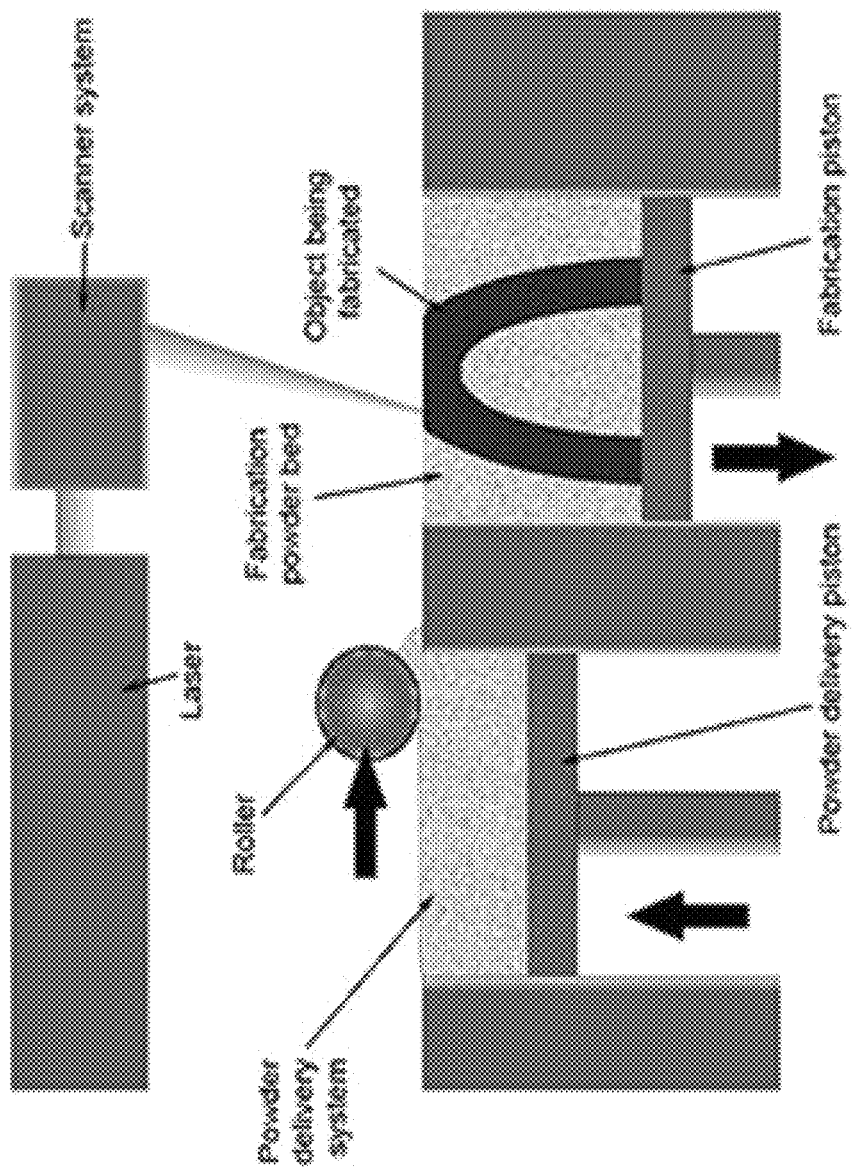
FIG. 5 illustrates a laser binding process for using powder metallurgy materials.

FIG. 5 shows a laser binding process for powder metallurgy materials. In a process comparable to selective laser sintering, a powder/binder mixture may be fed from a powder delivery system to a fabrication bed. The binder may be activated on a layer-by-layer basis using a laser or other activation source to create a low strength bond within the powder for each cross section of a target shape. This activation may form a sufficient bond to retain the powder and binder in a net shape green body that can be removed and sintered using the sintering processes described herein. Suitable binders are available that can be activated using relatively inexpensive, low power, fast laser processes or masked IR or UV. This significantly improves upon existing direct metal laser sintering processes that would otherwise require special atmospheric controls and high-power lasers.

Higher energy lasers may be usefully employed, for example, to more fully melt and/or remove binder material and improve the density of the green body before sintering, or to initiate sintering of the metal within the green body. In another aspect, the MIM materials described herein may be adapted for use in a selective laser melting process where the binder melts, rather than sinters, to form a net-shape green body which is then debound and sintered according to the methods described herein.

Support Structures

A support structure can be used to provide structural support to an object fabricated according to any one of the various different additive manufacturing techniques described herein. For example, the support structure can be useful for providing structural support to the object as the object is debind to form a brown part and, additionally or alternatively, for providing structural support to the brown part as the brown part is sintered to form a final part. The object and the support structure can be fabricated according to any of the various different manufacturing processes described herein and, for example, can be fabricated as part of the same additive manufacturing process. An interface layer can be applied between the object and the support structure to facilitate, for example, removal of the support structure from the object at an appropriate point in the formation of the object into the final part.

Figure 6A:
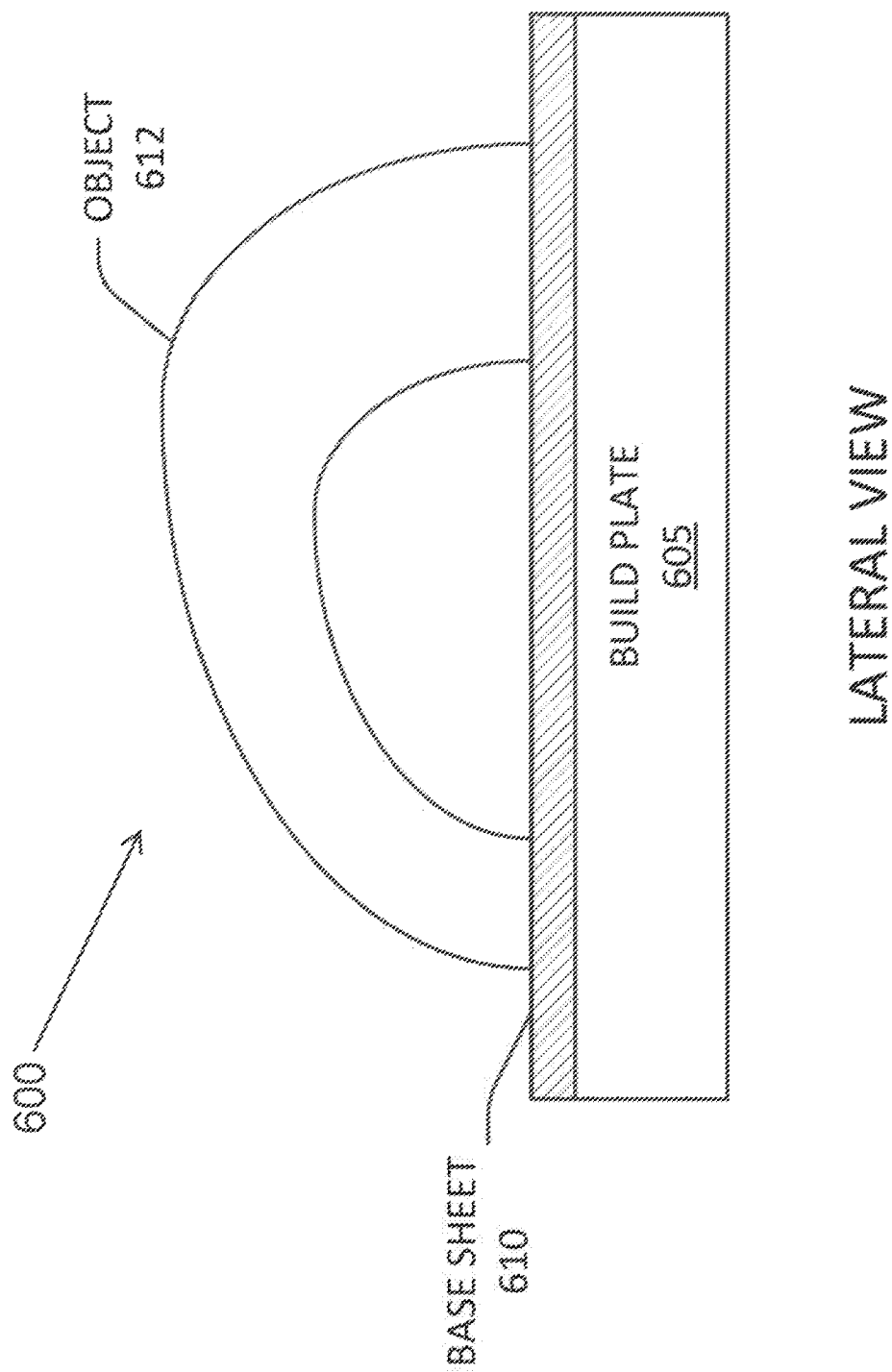
FIGS. 6A-B illustrate an assembly including an object and a base sheet.
Figure 6B:
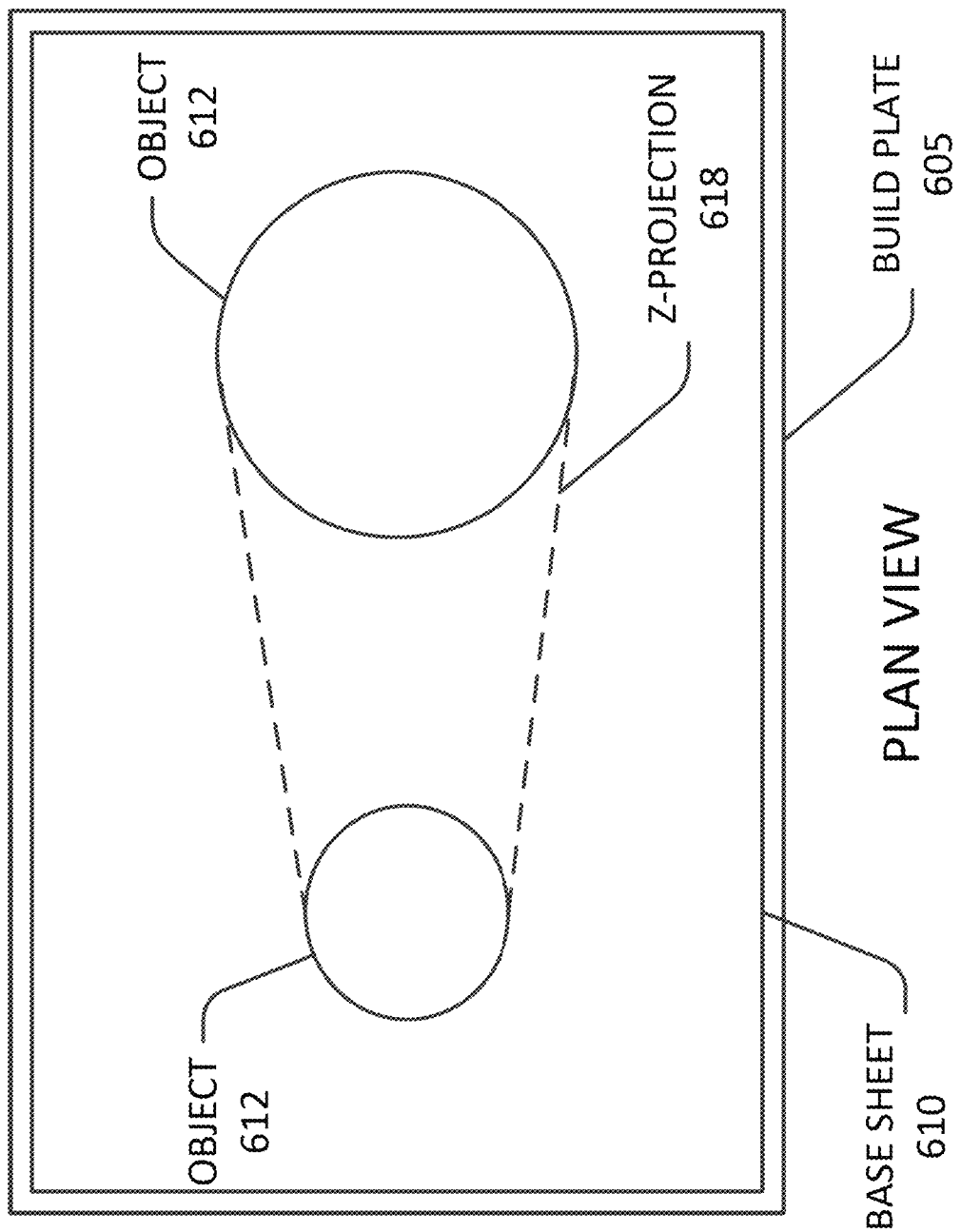

FIGS. 6A-B illustrate an object 612 residing atop a build plate 605 (e.g., a bed of a 3D printer). FIG. 6A shows a lateral (i.e., cross-sectional) view of the object 612 and build plate 605, while FIG. 6B depicts a plan ("top-down") view. The object 612 may be fabricated and processed via one or more of the manufacturing processes as described above with reference to FIGS. 1-5. In particular, the object 612 may be printed by a 3D printer such as the printer 100 described above, and the object 612 and build plate 605 may incorporate one or more features of the object 112 and build plate 114 respectively, as described above with reference to FIG. 1. Prior to or during printing, the geometry of the assembly 600 may be defined by a three-dimensional model comparable to the model 122 described above with reference to FIG. 1. Following printing, the assembly 100 (as a green part) may undergo further processing as described above, including debinding and sintering, to produce a finished object that may be separated from the remaining support structures of the assembly 600.

Prior to printing the object 612, a base sheet 610 may be secured to a portion or the entire surface of the build plate 605. The base sheet 610 may be a relatively thin layer (e.g., ~0.1-3 mm thick) that is rigidly adhered to the build plate 605. The base sheet 610 may be secured by one or more of several means, such as via a temporary adhesive between the base sheet 610 and build plate 605, clips, rivets, magnets, or other device. Alternatively, the base sheet 610 may be printed onto the base plate 605 by the printer. The base sheet 610 may be composed of a material, such as polypropylene and polyethylene, that adheres to a binder component (e.g., a secondary binder) of the feedstock used to print the object 612. During printing, the first layer of the printed object 612 forms a bond with the base sheet 610, which secures the location of the first layer and resists movement of the object 612 during printing. Following printing and the object 612 gaining sufficient rigidity (e.g., following cooling and/or drying), the object 612 and sheet 610 can be removed together from the printer. The sheet 610 may then be peeled from the object 612 at the contact points of the first layer, and the object can undergo debinding and/or sintering to create a finished object. Alternatively, the object 612 may be peeled from the base sheet 610 within the printer, with or without the removal of the base sheet 610.

As shown in the plan view of FIG. 6B, the object 612 has a footprint comprising two distinct contact areas with the base sheet 610. The base sheet 610 may occupy an area less than that of the build plate 605, and may have a geometry generally conforming to the footprint of the object 612. The base sheet 610 may also include an offset extending beyond the footprint of the object 612, which may aid in separating the object 612 and base sheet 610 following printing or of the assembly 600.

The base sheet 610 and the object 612 may include a common material, such as a binder material. By adhering to the first layer of the printed object 612, the base sheet resists movement of the object 612 during printing. As a result, the object 612 may avoid adverse deformation during printing due to movement or vibration of the base plate, or stress applied to portions of the object by subsequent layers.

An example method can include fabricating a support structure for an object, applying an interface layer adjacent to the support structure, applying an interface layer adjacent to the support structure, and fabricating a surface of the object adjacent to the interface layer. The support structure can be fabricated from a first material, and the surface of the object can be fabricated from a second material. The second material can include a powdered material for forming a final part. The second material can, additionally or alternatively, include a binder system including one or more binders. The one or more binders can, for example, retain a net shape of the object during fabricating, debinding, and sintering. The interface layer can resist bonding of the support structure to the object during sintering and, for at least this reason, can facilitate separation of the support structure from the object.

The second material can include a powdered metallurgy material such as a metal powder, a ceramic powder, or combinations thereof. Additionally, or alternatively, the powdered material is a sinterable material such that, upon exposure to sufficient heat, bonds are formed between the particles of the powder. In certain instances, the sintered object can have a density substantially equal to the density of the material of the particles of the powder. Further, or instead, the second material can include an infiltrable powder with at least one of a metallic infiltrant and a ceramic infiltrant.

In certain instances, the binder system can include a single binder. The single binder can be removable from the object through, for example, a pure thermal debind. That is, the single binder can be removable from the object through a debinding process that includes only the application of thermal energy to the object. In certain implementations, fabricating the surface of the object can include applying the single binder in a binder jetting process, such as any of various different binder jetting processes known in the art.

In some instances, the binder system can include a first binder and a second binder. The first binder can, for example, retain a net shape of the object during debinding of the object. Additionally, or alternatively, the second binder can retain a net shape of the object during sintering of the object. Thus, separate, respective processes can be used to remove the first binder and the second binder from the object. For example, the first binder can be removed from the object through any one or more of various different debinding processes. Examples of such debinding processes include thermal debinding, chemical debinding, catalytic debinding, supercritical debinding, microwaving the object, evaporation, and combinations thereof. Additionally, or alternatively, the object can be heated to remove the second binder.

In certain instances, the binder system can include a first binder and at least one other binder, with the first binder forming about 20 percent to about 98 percent by volume of the first binder and the at least one other binder. In such instances, the example method can further include debinding the first binder from the object to create open pore channels for the at least one other binder. The at least one other binder can be removed, for example, from the object prior to sintering the object (e.g., in a pre-sintering step). The binder system can, in certain applications, include at least one polymer. More generally, the binder system can include one or more materials other than the one or more binders.

Applying an interface layer can include fabricating the interface layer using any one or more of the various different additive manufacturing processes described herein or known in the art, to the extent such additive manufacturing processes are compatible with application of the interface layer. Examples of additive manufacturing processes that can be used to fabricate the interface layer include fused filament fabrication, binder jetting, and stereolithography. Additionally, or alternatively, fabricating the support structure can include applying the first material using binder jetting and, further or instead, applying the interface layer can include inkjetting a ceramic-loaded slurry onto the support structure.

Applying the interface layer can, additionally or alternatively, include depositing a suspension on the support structure. For example, depositing the suspension can include at least one of inkjetting, spraying, micropipetting, and painting the interface layer onto the support structure. The suspension can include a medium (e.g., a ceramic medium) resistant to sintering at a sintering temperature of the powdered material. The suspension can, also or instead, include a selective embrittlement material that selectively embrittles a bond between the support structure and the surface of the object.

In certain instances, the interface layer can be formed of a dissolvable material that substantially completely dissolves during a debind prior to sintering. As used herein, a dissolvable material that substantially completely dissolves may include a material that dissolves sufficiently to separate the support structure from the object. Further, or instead, the interface layer can include a ceramic powder to maintain physical separation of the first material and the second material after the dissolvable material is removed.

Applying the interface layer can, in some instances, include selectively oxidizing the interface layer to inhibit bonding of the second material of the object. Such selective oxidation can include, for example, oxidizing with a laser. Matching shrinkage rate of the interface layer to at least one of the first material of the support and the second material of the object can, for example, control mechanical stress at the interface between the interface layer and the respective other surface. Thus, controlling shrinkage of the object, the interface, and/or the support structure can be useful for controlling removal of the support structure from the object during debinding and/or sintering.

The interface layer can be formed of a material with a debind shrinkage rate matched to at least one of the first material of the support and the second material of the object. Additionally, or alternatively, the interface layer can be formed of a material with a sintering shrinkage rate matched to at least one of the first material of the support and the second material of the object. In certain instances, the interface layer can include a material having a powdery macrostructure such that the material can microscopically densify during sintering without solidifying the powdery macrostructure. Examples of such materials having a powdery macrostructure include aluminum hydroxide, gamma alumina, iron oxide and combinations thereof. The interface layer can, for example, be formed of a ceramic-loaded polymer.

The interface layer can, in certain instances, be fabricated from a composition including a ceramic additive. The ceramic additive can inhibit bonding between the support structure and the surface of the object during sintering. As an example, the composition including the ceramic additive can include the binder system of the second material. Additionally, or alternatively, the composition including the ceramic additive can include a second binder system of the first material.

In implementations in which the powdered material includes a metal powder, the interface layer can be fabricated from a composition that includes a second phase material with a melting point below a melting point of the metal powder and above a melting point of the binder. With a composition including such a second phase material, the interface layer can be melted out of the object during sintering.

The interface layer can be formed of a pre-ceramic polymer. Such a pre-ceramic polymer can be, for example, decomposable into a ceramic during sintering. The interface layer can, further or instead, include a finishing material. An example of such a finishing material is an alloying metal having aesthetic finish, such as, for example, titanium. In such implementations in which the interface layer includes a finishing material, applying the interface layer can include applying the interface layer to one or more exterior surfaces of the object. For example, applying the interface layer can include fully encapsulating the object.

By way of further example, the interface layer can include a suscepting material (e.g., SiC). In such implementations, applying the interface layer can include applying the interface layer in one or more locations. For examples, the one or more locations can be selected to focus microwave heating during a microwave sintering process. As still another example, the interface layer can include a ceramic compatible with the second material. That is, the interface layer can include a ceramic nonreactive with, or at least substantially non-reactive with, the second material. For example, the second material can include titanium, and the interface layer can include yttria.

An example method can, additionally, or alternatively, include underextruding at least one of the support structure, the surface of the object, and the interface layer in a fused filament fabrication process. Such underextrusion can be achieved, for example, using at least one of an increased tool speed, an increased nozzle height, and a decreased volumetric deposition rate. The example method can, further or instead, include depositing at least one of the support structure, the interface layer, and the object in a manner that inhibits bonding of the support structure to the object while sintering. Additionally, or alternatively, the example method can include depositing at least one of the support structure, the interface layer, and the object in a manner that inhibits mixing with the interface layer.

In general, the first material of a support structure and the second material of the object (e.g., the object 612) can have similar compositions and/or properties. For example, the first material and the second material can have a substantially similar composition. Additionally, or alternatively, the first material and the second material can each include a common build material, which can be deposited, for example, from a single nozzle of a fused filament fabrication device. Still further or in the alternative, the first material and the second material can have similar shrinkage rates. For example, the first material and the second material can shrink at similar rates during debind and sintering. As a further example, the first material of the support structure can shrink at a similar rate to the second material during a debind and shrink at a substantially greater rate than the second material during a sinter to maintain the support structure in contact with the object during sinter.

In some instances, at least one of the first material of the support structure and the interface layer can be formed of a composition including microspheres. The microspheres can, for example, controllably collapse under pressure to reduce volume of the respective support structure and the interface layer. Such a reduction in volume can, under certain conditions, separate the object from the support structure. In certain instances, the first material can include a constituent with a substantially greater chemical affinity for oxygen than the chemical affinity of the second material for oxygen. The support structure can include, for example, a filament coupled to a top surface of the object at a location selected to prevent slumping of the object during at least one debind and sintering. The filament can form a spring. In such instances, the support structure can include a frame coupled by the spring to the object. The frame can be fabricated, for example, from a material selected to shrink at a predetermined rate during the debind and sintering of the object.

Fabrication Techniques

Any of various different additive manufacturing techniques can be used to fabricate any one or more of the object, the interface layer, and the support structure as described above with reference to FIGS. 1-6. For example, fabricating the support structure and/or the object can include using fused filament fabrication or binder jetting. Additionally, or alternatively, fabricating the support structure can include additively manufacturing the support structure through optical curing of a layer of powder-loaded resin. Further or instead, fabricating the object can include additively manufacturing the object through optical curing of a layer of powder-loaded resin.

A base plate, such as the base plate 610 described above with reference to FIGS. 6A-B, can be formed, for example, by injection molding with a material having a debind shrinkage rate and a sintering shrinkage rate matching at least one of the first material and the second material. Additionally, or alternatively, fabricating the support structure can include fabricating a surface from the first material on a build plate to receive the object.

The example method can further include fabricating a build plate for the support structure and the object. The build plate can include, for example, one or more independent plates coupled by an interconnection. The interconnection can move the independent plates together at a rate corresponding to shrinkage of the object during at least one of debind and sintering. The example method can, in certain implementations, further include fabricating a second interface layer on a build plate. In such implementations, the object can be removable from the build plate.

In certain implementations, a support structure and an object can be fabricated separately and assembled into a single component for further processing (e.g., debinding and/or sintering). Such separate fabrication of the support structure and the object can be useful, for example, for simplifying fabrication of one or both of the support structure and the object. As another example, separate fabrication of the support structure and the object can facilitate application of an interface layer between the support structure and the object.

An assembly including the object, the support structure, and the interface layer described herein can be formed by any one or more of the example methods of forming the assembly described herein. Further, a system for making the assembly including the object, the support structure, and the interface layer described herein can include an additive manufacturing platform that can form the assembly according to any one or more of the following example methods, a debinding station to remove at least one of the one or more binders from the object, and a sintering oven to heat the object to form bonds (e.g., necks) between particles of the powdered material, with the interface layer resisting bonding of the support structure to the object during sintering. Still further, to the extent the methods described above with respect to removable support structures are compatible and combinable with the following methods, the methods described above may modify and/or augment the following example methods.

An example method can include fabricating a support structure for an object from a first material, fabricating the object from a second material, applying an interface layer to at least one of the support structure and the object, and assembling the support structure and the object together. The object can include a surface positionable adjacent to and supportable by the support structure. Additionally, or alternatively, the second material can include powdered material for forming a final part and a binder system including a first binder and a second binder. The first binder can retain a net shape of the object during fabrication, and the second binder can retain the net shape of the object during sintering of the object into the final part. The interface layer can be applied, for example, at a location corresponding to the surface of the object positionable adjacent to and supportable by the support structure. The interface layer can resist bonding of the support structure to the object during sintering such that the interface layer facilitates, for example, removal of the support structure from the object to form the final part with a reduced likelihood of deformation or other type of damage to the final part.

The first material and the second material can be any of the material described above with respect to the removable support structure. Thus, for example, the first material and the second material can be substantially similar compositions. Additionally, or alternatively, the first material and the second material can be deposited from a single source. The example method can further include processing the assembly of the support structure and the object. For example, the example method can further include one or more of debinding the object and the support structure and sintering the object and the support structure.

In some implementations, a multi-part object with multiple, mechanically related components can be fabricated in a single print job. In such implementations, an interface layer can be disposed between a first object and a second object to facilitate, for example, controlled separation of the first object and the second object. An assembly including the first object, the second object, and the interface layer described herein can be formed by any one or more of the following example methods of forming an assembly. Further, a system for making the assembly including the first object, the second object, and the interface layer described herein can include an additive manufacturing platform that can form the assembly according to any one or more of the following example methods, a debinding station to remove at least one of the one or more binders from the first object and the second object, and a sintering oven to heat the first object and the second object to form bonds (e.g., necks) between particles of the powdered material, with the interface layer resisting bonding of the first surface of the first object to the second surface of the second object. Still further, to the extent the methods described above with respect to removable support structures are compatible and combinable with the following methods, the methods described above may modify and/or augment the following example methods.

An example method can include fabricating a first object from a first material, applying an interface layer adjacent to a first surface of the first object, and fabricating a second surface of a second object from the first material at a location adjacent to the interface layer and opposing the first surface of the object. The first material can include a powdered material and a binder system. The binder system can include a first binder that retains a net shape of the object during fabrication and a second binder that retains the net shape of the object during sintering of the first object into a final part. The second object can be independent from the first object. Additionally, or alternatively, the interface layer can resist bonding of the first surface to the second surface. Thus, for example, the interface layer can facilitate controlled separation of the first object from the second object such that there is a reduced likelihood of deformation or other type of damage to the first object and the second object.

In certain implementations, the first object and the second object can form a multi-part assembly. In such implementations, the example method can further include providing a physical exit path within the multi-part assembly for a third material of the interface layer. Additionally, or alternatively, in such implementations, the example method can further include providing a physical exit path within the multi-part assembly for extraction of a support material.

In some implementations, an object and a removable support structures (e.g., modular support structures) can be fabricated, with the support structure providing structural support for an interior cavity of the object. Such a removable support structure can facilitate, for example, fabrication of objects with complex geometries.

An assembly including the object and the support structure described herein can be formed by any one or more of the following example methods of forming the assembly. Further, a system for making the assembly including the object and the support structure described herein can include an additive manufacturing platform that can form the assembly according to any one or more of the following example methods, a debinding station to remove at least one of the one or more binders from the object, and a sintering oven to heat the object to form bonds (e.g., necks) between particles of powdered material forming the object. Still further, to the extent the methods described above with respect to removable support structures are compatible and combinable with the following methods, the methods described above may modify and/or augment the following example methods.

An example method can include fabricating an object from a build material and fabricating a support structure for an interior surface of the object. The object can have, for example, a cavity and a passageway. The cavity can include the interior surface requiring support during fabrication. Additionally, or alternatively, the passageway can provide an open passage between the cavity and an exterior environment for the object. The support structure can include a composite support structure formed from a plurality of independent support structures. The plurality of independent support structures can collectively provide support to the interior surface to satisfy a fabrication rule for the build material. The passageway can be smaller than the composite support structure, and each independent support structure can be shaped and sized for individual removal from the cavity through the passageway.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. Further, a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above.

Embodiments described herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

While this invention has been particularly shown and described with references to example embodiments thereof, it will be understood by those skilled in the art that various changes in form and details may be made therein without departing from the scope of the invention encompassed by the appended claims.

What is claimed is:

1. A method of forming an object using additive manufacturing, the method comprising:
   securing a base sheet to a top surface of a build plate of a three-dimensional (3D) printer, wherein an outer perimeter of the base sheet defines a print area;
   printing a first layer of a build material, including a metal powder and a binder material, in the print area;
   printing additional layers of the build material above the first layer layer-by-layer, wherein the first layer and the additional layers collectively form the object; and
   separating the base sheet and the object,
   wherein the base sheet includes at least one component that is also included in the binder material, and wherein the at least one component in the base sheet adheres to the at least one component in the binder material.

2. The method according to claim 1, wherein the separating step includes removing the base sheet from the top surface of the build plate, and peeling the base sheet from the object.

3. The method according to claim 1, further comprising:
   de-binding at least a portion of the binder material from the object after separating the base sheet and the object; and
   sintering the object.

4. The method according to claim 1, wherein the at least one component includes one or more of a polypropylene, a polyethylene, a poly(ethylene glycol), a poly(ethylene glycol) diacrylate, or an ultraviolet curable resin.

5. The method according to claim 1, wherein the binder material includes a first binder and a second binder different from the first binder.

6. The method according to claim 5, wherein the first binder is removable with a chemical solvent, and wherein the at least one component in the base sheet adheres to the first binder.

7. The method according to claim 1, wherein the at least one component in the base sheet forms a cross-linked bond with the at least one component in the binder material.

8. The method according to claim 1, wherein the securing the base sheet includes depositing a layer of material on the top surface of the build plate, the layer of material forming the base sheet.

9. The method according to claim 1, wherein an area of the first layer is less than or equal to the print area.

10. The method according to claim 1, wherein a geometry of the base sheet corresponds to a geometry of the first layer of the build material.

11. The method according to claim 1, further comprising depositing a ceramic material on the base sheet prior to printing the first layer of the build material.

12. A method of forming an object using additive manufacturing, the method comprising:
    depositing a base sheet including a first material on a top surface of a build plate of a three-dimensional (3D) printer, wherein an outer perimeter of the base sheet defines a print area;
    printing an object from a build material including a metal powder and a binder material, including printing a first layer of the object in the print area; and
    removing the base sheet from the object after the object is printed,
    wherein the first material of the base sheet includes at least one component that is also included in the binder material, and wherein the at least one component in the first material of the base sheet adheres to the at least one component in the binder material.

13. The method according to claim 12, further comprising depositing a ceramic material on the base sheet prior to printing the first layer of the build material.

14. The method according to claim 12, further comprising:
    de-binding at least a portion of the binder material from the object after removing the base sheet from the object; and
    sintering the object to form a finished product.

15. The method according to claim 12, further comprising:
    exposing at least a portion of the object and at least a portion of the base sheet to a chemical solvent.

16. A method of forming an object using additive manufacturing, the method comprising:
    generating a fixing force between a build plate of a three-dimensional (3D) printer and a base sheet disposed on a surface of the build plate;
    printing an object from a build material including a metal powder and a binder material on the base sheet layer by layer;
    removing the base sheet from the object after the object is printed; and
    de-binding the binder material from the object,
    wherein the base sheet includes at least one component that is also included in the binder material, and wherein the at least one component in the base sheet adheres to the at least one component in the binder material.

17. The method according to claim 16, wherein the removing step is performed before the de-binding step.

18. The method according to claim 16, wherein generating the fixing force includes generating a vacuum force or a magnetic force.

19. The method according to claim 16, wherein the base sheet remains secured to the build plate during the removing step.

20. The method according to claim 16, wherein the at least one component in the base sheet forms a cross-linked bond with the at last one component in the binder material.

* * * * *